(12) United States Patent
Tokunaga (10) Patent No.: US 12,098,940 B2
(45) Date of Patent: Sep. 24, 2024

(54) PRESSURE CONTROL SYSTEM, PRESSURE CONTROL METHOD, AND PRESSURE CONTROL PROGRAM

(71) Applicant: HORIBA STEC, Co., Ltd., Kyoto (JP)

(72) Inventor: Kazuya Tokunaga, Kyoto (JP)

(73) Assignee: HORIBA STEC, Co., Ltd., Kyoto (JP)

( * ) Notice: Subject to any disclaimer, the term of this patent is extended or adjusted under 35 U.S.C. 154(b) by 429 days.

(21) Appl. No.: 17/571,758

(22) Filed: Jan. 10, 2022

(65) Prior Publication Data

US 2022/0228896 A1 Jul. 21, 2022

(30) Foreign Application Priority Data

Jan. 15, 2021 (JP) ................................. 2021-005110

(51) Int. Cl.
*G01F 15/00* (2006.01)
*G05D 7/06* (2006.01)
(Continued)

(52) U.S. Cl.
CPC ......... *G01F 15/005* (2013.01); *G05D 7/0635* (2013.01); *F16K 47/08* (2013.01); *G01F 1/36* (2013.01); *G01F 15/001* (2013.01)

(58) Field of Classification Search
None
See application file for complete search history.

(56) References Cited

U.S. PATENT DOCUMENTS 4,311,436 A * 1/1982 Hendriks ................... B41J 2/02
417/63
4,476,707 A * 10/1984 Burns .................... A61B 5/087
73/1.64
(Continued)

FOREIGN PATENT DOCUMENTS

JP H06089115 A 3/1994
JP 2002091573 A 3/2002
(Continued)

OTHER PUBLICATIONS

Japan Patent Office, Office Action Issued in Application No. 2021-005110, Aug. 1, 2024, 5 pages.

*Primary Examiner* — Jason Lin
(74) *Attorney, Agent, or Firm* — Alleman Hall & Tuttle LLP (57) ABSTRACT

The present invention controls convergent pressure of a closed space provided with a fluid resistance at high speed while an upstream valve provided on the upstream of the fluid resistance prevents overshooting. A pressure control system is provided with a fluid resistance in a channel forming a closed space and is configured to control pressure of the closed space by controlling an upstream valve provided on the upstream of the fluid resistance. The pressure control system includes a convergent pressure arithmetic unit and a valve controller. The convergent pressure arithmetic unit calculates convergent pressure of the closed space when the upstream valve is fully closed using at least one of upstream pressure and downstream pressure on the fluid resistance in the channel. The valve controller compares the calculated convergent pressure with a predetermined target convergent pressure and fully close the upstream valve based on the result of the comparison.

11 Claims, 4 Drawing Sheets

(51) Int. Cl.
*F16K 47/08* (2006.01)
*G01F 1/36* (2006.01)

(56) References Cited

U.S. PATENT DOCUMENTS

| | | | | |
|---|---|---|---|---|
| 4,754,651 A | * | 7/1988 | Shortridge | G01F 1/46 |
| | | | | 73/717 |
| 4,817,426 A | * | 4/1989 | Igenbergs | B64D 43/02 |
| | | | | 73/182 |
| 6,119,710 A | * | 9/2000 | Brown | G01F 1/88 |
| | | | | 137/486 |
| 6,609,431 B1 | * | 8/2003 | Tietsworth | G01F 1/36 |
| | | | | 73/861.52 |
| 6,917,886 B2 | * | 7/2005 | Cohen | G01F 1/68 |
| | | | | 702/45 |
| 7,073,392 B2 | * | 7/2006 | Lull | G01F 1/86 |
| | | | | 702/50 |
| 8,393,227 B2 | * | 3/2013 | Itoh | H01L 21/67017 |
| | | | | 73/861.44 |
| 8,820,177 B2 | * | 9/2014 | Morris | G01F 1/34 |
| | | | | 73/861.42 |
| 10,096,497 B2 | * | 10/2018 | Sato | B05C 11/1039 |
| 2004/0226507 A1 | * | 11/2004 | Carpenter | C23C 16/52 |
| | | | | 118/715 |
| 2006/0225772 A1 | * | 10/2006 | Jones | B08B 7/0021 |
| | | | | 156/345.13 |
| 2009/0193908 A1 | * | 8/2009 | Dana | G01F 1/06 |
| | | | | 73/861.08 |
| 2013/0092258 A1 | * | 4/2013 | Yasuda | G01F 1/6842 |
| | | | | 137/487 |
| 2020/0232873 A1 | * | 7/2020 | Nagase | G05D 7/0635 |

FOREIGN PATENT DOCUMENTS

| | | |
|---|---|---|
| JP | 2003084840 A | 3/2003 |
| JP | 2004280688 A | 10/2004 |
| WO | 2017110066 A1 | 6/2017 |

\* cited by examiner

PRESSURE CONTROL SYSTEM, PRESSURE CONTROL METHOD, AND PRESSURE CONTROL PROGRAM

BACKGROUND OF THE INVENTION

1. Field of the Invention

The present invention relates to a pressure control system, a pressure control method, and a pressure control program.

2. Description of the Related Art

As described in Japanese Patent Application Laid-open No. 2004-280688, there has conventionally been thought of a fluid control apparatus having a configuration including an upstream valve provided on the upstream of fluid resistance provided in a channel through which a fluid flows and a downstream valve provided on the downstream of the fluid resistance, the fluid control apparatus controlling a flow rate of the fluid flowing through the channel by controlling the upstream valve and the downstream valve.

To shut off the channel, the fluid control apparatus fully closes both the upstream valve and the downstream valve. If the pressure between the upstream valve and the downstream valve (closed space including the fluid resistance) fluctuates every time flow rate control starts thereafter, the fluid control apparatus fails to stably start the flow rate control. To stably start flow rate control, the pressure between the upstream valve and the downstream valve (closed space including the fluid resistance) is preferably set to a predetermined convergent pressure.

Conventionally, therefore, both the upstream valve and the downstream valve are fully closed and then the upstream valve is opened to cause the fluid to flow into the channel. The upstream valve is closed when an upstream pressure on the fluid resistance reaches a predetermined target pressure.

Figure 4A:
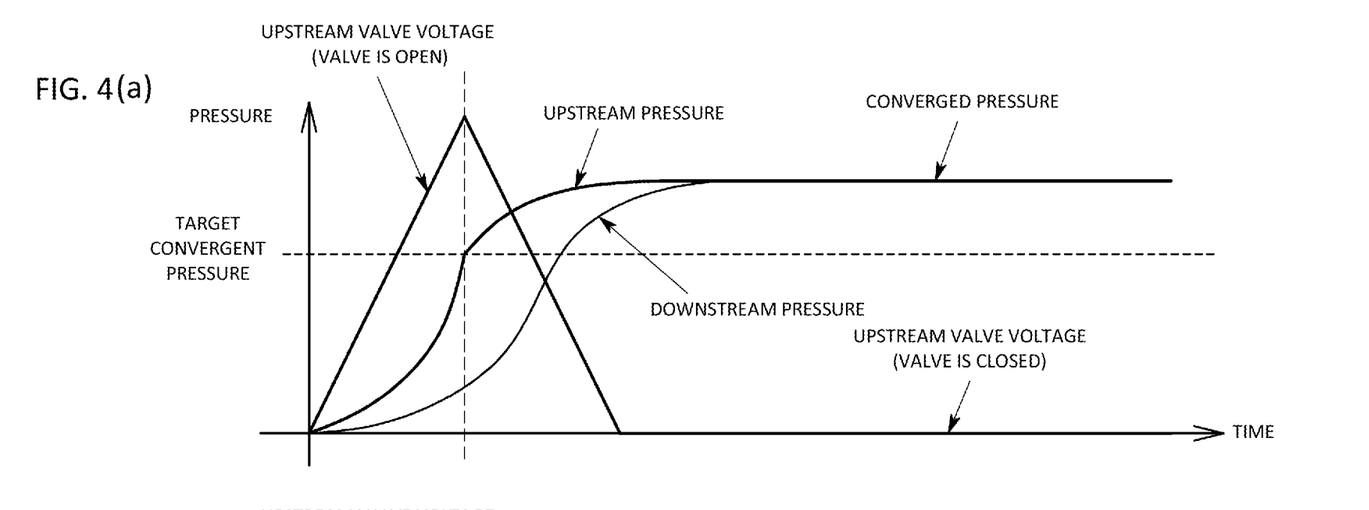
FIGS. 4(a) and 4(b) are graphs indicating methods for controlling convergent pressure according to the conventional technology.
Figure 4B:
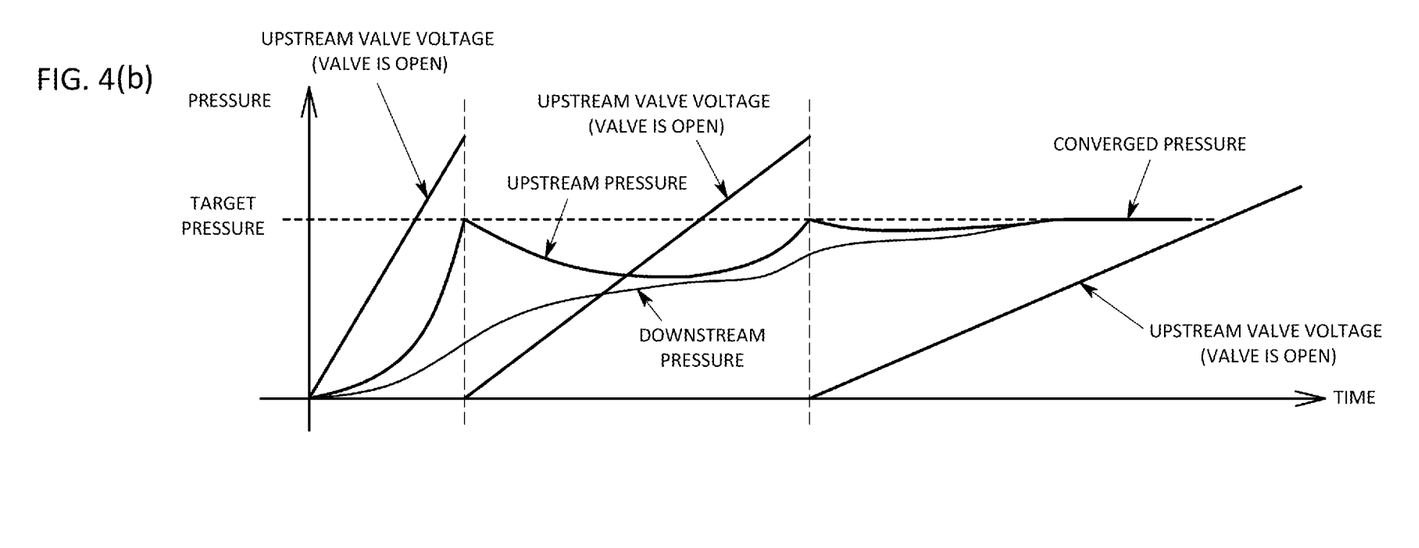

In the configuration that closes the upstream valve when the upstream pressure on the fluid resistance reaches the predetermined target pressure, however, the channel through which the fluid flows is blocked on the downstream of the fluid resistance. As a result, the pressure in the closed space including the fluid resistance exceeds the predetermined convergent pressure (refer to FIG. 4(a)). If flow rate control is started in a state where the pressure exceeds the predetermined convergent pressure, the accuracy of flow rate measurement deteriorates, resulting in reduced controllability in flow rate control. To prevent the upstream pressure from exceeding the predetermined convergent pressure, it is possible to perform on-off control on the upstream valve; however, such a configuration increases the time until the upstream pressure converges to the convergent pressure (refer to FIG. 4(b)).

SUMMARY OF THE INVENTION

To address the disadvantages described above, an object to of the present invention is to control convergent pressure of a closed space provided with a fluid resistance at high speed while an upstream valve provided on the upstream of the fluid resistance prevents overshooting.

A pressure control system according to the present invention is a pressure control system that is provided with a fluid resistance in a channel forming a closed space and is configured to control pressure of the closed space by controlling an upstream valve provided on the upstream of the fluid resistance. The pressure control system includes: a convergent pressure arithmetic unit configured to calculate convergent pressure of the closed space when the upstream valve is fully closed using at least one of upstream pressure and downstream pressure on the fluid resistance in the channel; and a valve controller configured to compare the calculated convergent pressure with a predetermined target convergent pressure and fully close the upstream valve based on a result of the comparison.

The pressure control system calculates the convergent pressure of the closed space when the upstream valve is fully closed using at least one of the upstream pressure and the downstream pressure on the fluid resistance. The pressure control system compares the calculated convergent pressure with the predetermined target convergent pressure and fully closes the upstream valve based on the result of the comparison. Consequently, the pressure control system can control the convergent pressure of the closed space at high speed while preventing overshooting. The predetermined target convergent pressure is set based on such a pressure that enables a fluid of a full-scale (100%) set flow rate to flow just after the valve is opened to start flow rate control.

The valve controller preferably fully closes the upstream valve when the calculated convergent pressure is equal to or higher than the predetermined target convergent pressure.

The pressure control system according to the present invention may further include a downstream valve provided on the downstream of the fluid resistance in the channel, fully closing the downstream valve forming a closed space on the downstream of the fluid resistance.

In this configuration, the convergent pressure arithmetic unit preferably calculates the convergent pressure using the upstream pressure on the fluid resistance, the downstream pressure on the fluid resistance, a channel volume between the fluid resistance and the upstream valve, and a channel volume between the fluid resistance and the downstream valve.

The convergent pressure arithmetic unit preferably calculates the convergent pressure using the following expression.

$$P_{CONV} = \frac{P_1 V_1 + P_2 V_2}{V_1 + V_2} \quad \text{Expression 1}$$

where $P_{CONV}$ is the convergent pressure, $P_1$ is the upstream pressure on the fluid resistance, $P_2$ is the downstream pressure on the fluid resistance, $V_1$ is the channel volume between the fluid resistance and the upstream valve, and $V_2$ is the channel volume between the fluid resistance and the downstream valve.

In the pressure control system according to the present invention, the closed space may be formed on the downstream of the fluid resistance by a closed container being coupled to the downstream of the fluid resistance in the channel. The convergent pressure arithmetic unit may calculate the convergent pressure using the upstream pressure on the fluid resistance, the downstream pressure on the fluid resistance, the channel volume between the fluid resistance and the upstream valve, and the volume of the channel on the downstream of the fluid resistance and the volume of the closed container.

The convergent pressure arithmetic unit preferably calculates the convergent pressure in real time using at least one of the upstream pressure and the downstream pressure on the fluid resistance in the channel.

The convergent pressure arithmetic unit preferably calculates the convergent pressure by correcting a change over time in the volume of the closed space or the channel.

The upstream valve is preferably provided with a position sensor configured to detect the position of a disc with respect to a seat. If the pressure control system includes the downstream valve, the downstream valve is preferably provided with a position sensor configured to detect the position of a disc with respect to a seat.

A pressure control method according to the present invention is a pressure control method performed by a pressure control system that is provided with a fluid resistance in a channel forming a closed space and is configured to control pressure of the closed space by controlling an upstream valve provided on the upstream of the fluid resistance. The pressure control method includes: calculating convergent pressure of the closed space when the upstream valve is fully closed using at least one of upstream pressure and downstream pressure on the fluid resistance in the channel; and comparing the calculated convergent pressure with a predetermined target convergent pressure and fully closing the upstream valve based on a result of the comparison.

A pressure control program according to the present invention is a pressure control program for use in a pressure control system that is provided with a fluid resistance in a channel forming a closed space and is configured to control pressure of the closed space by controlling an upstream valve provided on the upstream of the fluid resistance. The pressure control program causes a computer to function as: a convergent pressure arithmetic unit configured to calculate convergent pressure of the closed space when the upstream valve is fully closed using at least one of upstream pressure and downstream pressure on the fluid resistance in the channel; and a valve controller configured to compare the calculated convergent pressure with a predetermined target convergent pressure and fully close the upstream valve based on a result of the comparison.

According to the present invention, the convergent pressure of the closed space provided with the fluid resistance can be controlled at high speed while the upstream valve provided on the upstream of the fluid resistance prevents overshooting.

DETAILED DESCRIPTION OF EMBODIMENTS

Exemplary embodiments of a fluid control apparatus including a pressure control system according to the present invention are described below with reference to the accompanying drawings.
Apparatus Configuration A fluid control apparatus 100 according to the present embodiment is used to supply gas serving as fluid to a chamber 300 at a set flow rate in a semiconductor manufacturing process, for example. The set flow rate is a step signal that rises or falls stepwise from a certain flow rate value to another flow rate value. The flow rate achieved by the fluid control apparatus 100 reaches the set flow rate in a predetermined period of time, and the magnitude of noise in a steady state falls within an allowable range.

Figure 1:
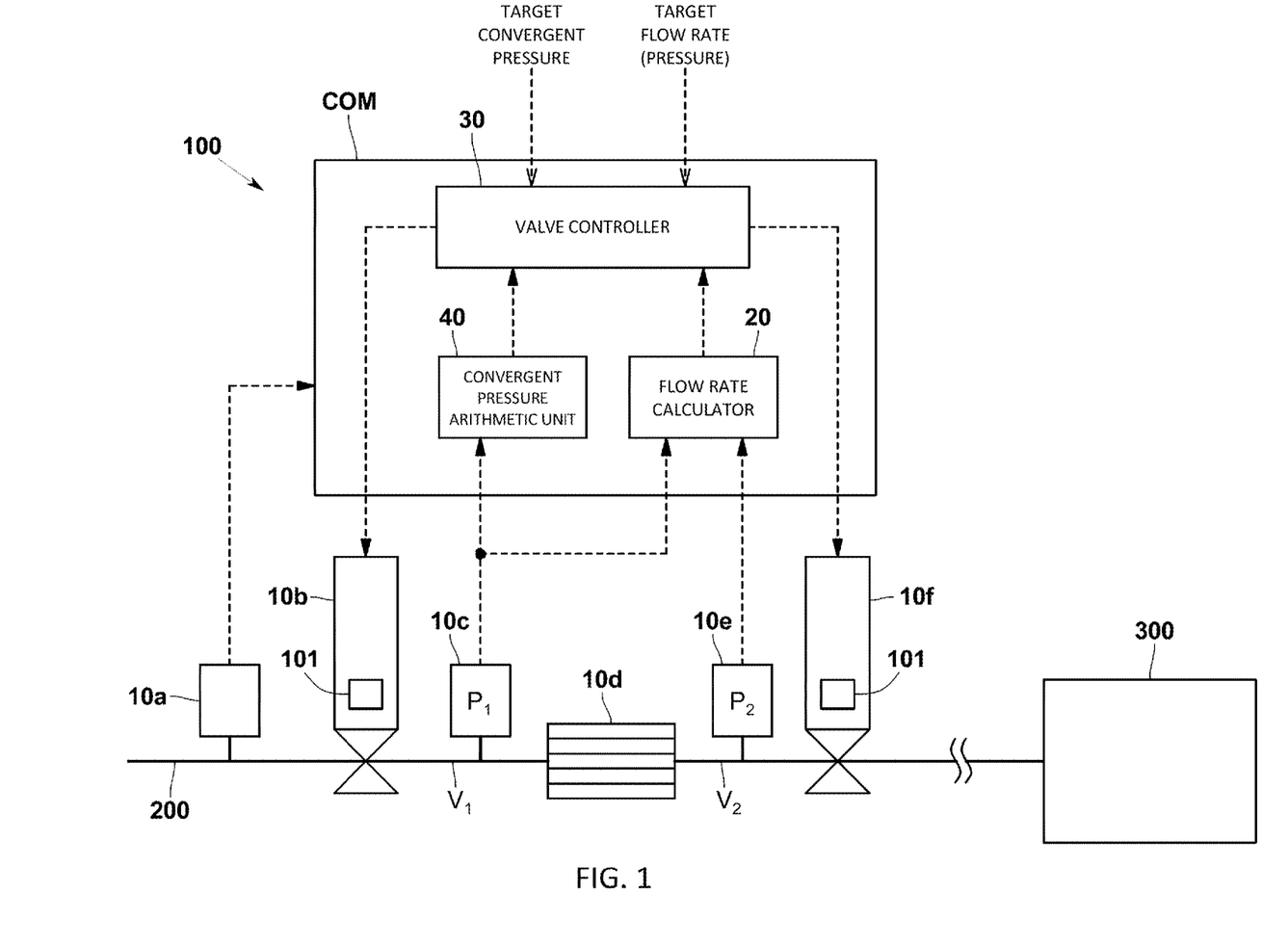
FIG. 1 is a schematic of a fluid control apparatus (pressure control system) according to an embodiment of the present invention.

Specifically, as illustrated in FIG. 1, the fluid control apparatus 100 includes fluid devices 10a to 10f and a control mechanism COM. The fluid devices 10a to 10f are sensors and valves, for example, provided to a channel 200 through which gas flows. The control mechanism COM controls the fluid devices 10a to 10f.

The fluid devices 10a to 10f according to the present embodiment are a supply pressure sensor 10a, an upstream valve 10b, an upstream pressure sensor 10c, a fluid resistance 10d, a downstream pressure sensor 10e, and a downstream valve 10f. The fluid devices 10a to 10f are provided to the channel 200 in order from the upstream. The fluid resistance 10d is a laminar flow element, for example, and generates differential pressure corresponding to the flow rate of gas flowing in front of and behind the fluid resistance 10d.

The supply pressure sensor 10a monitors the pressure of gas supplied from the upstream. The supply pressure sensor 10a is not necessarily provided if stable supply pressure is ensured, for example.

The upstream pressure sensor 10c measures upstream pressure $P_1$ on the fluid resistance 10d in the channel 200. Specifically, the upstream pressure sensor 10c measures the upstream pressure $P_1$ corresponding to the pressure of gas charged in an upstream volume $V_1$, which is the volume between the upstream valve 10b and the fluid resistance 10d in the channel 200.

The downstream pressure sensor 10e measures downstream pressure $P_2$ on the fluid resistance 10d in the channel 200. Specifically, the downstream pressure sensor 10e measures the downstream pressure $P_2$ corresponding to the pressure of gas charged in a downstream volume $V_2$, which is the volume between the fluid resistance 10d and the downstream valve 10f in the channel 200.

The upstream valve 10b and the downstream valve 10f according to the present embodiment are of the same type. The upstream valve 10b and the downstream valve 10f are piezo valves in which a disc is driven by an actuator, such as a piezoelectric element, in a manner attachable to and detachable from a seat. The valve opening of the upstream valve 10b and the downstream valve 10f is changed depending on a voltage applied as an operating amount. The upstream valve 10b and the downstream valve 10f are each provided with a position sensor 101 that detects the position of the disc with respect to the seat. By using the position detected by the position sensor 101, the fluid control apparatus 100 can accurately perform flow rate control with the upstream valve 10b or the downstream valve 10f.

The control mechanism COM is what is called a computer including a CPU, a memory, an A/D converter, a D/A converter, and an input-output unit, for example. The control mechanism COM implements the functions of at least a flow rate calculator 20 and a valve controller 30 by executing a flow rate control program stored in the memory and causing various devices to cooperate.

The flow rate calculator 20 calculates a flow rate value based on the upstream pressure $P_1$ and the downstream pressure $P_2$. The flow rate calculator 20 calculates a resistance flow rate corresponding to the flow rate of gas flowing through the fluid resistance 10d based on the upstream pressure $P_1$ and the downstream pressure $P_2$ using an existing expression. The flow rate calculator 20 may calculate an upstream valve flow rate corresponding to the flow rate of gas flowing through the upstream valve 10b based on the resistance flow rate and the upstream pressure $P_1$. The flow rate calculator 20 may calculate a downstream valve flow rate corresponding to the flow rate of gas flowing through the downstream valve 10f based on the resistance flow rate and the downstream pressure $P_2$.

The valve controller 30 performs feedback control on at least one of the upstream valve 10b and the downstream valve 10f such that the flow rate calculated by the flow rate calculator 20 approaches a predetermined flow rate target value. The valve controller 30 may perform feedback control on the upstream valve 10b such that the upstream pressure $P_1$ obtained by the upstream pressure sensor 10c approaches a predetermined pressure target value without performing flow rate control on the upstream valve 10b. The valve controller 30 may perform feedback control on the downstream valve 10f such that the downstream pressure $P_2$ obtained by the downstream pressure sensor 10e approaches a predetermined pressure target value without performing flow rate control on the downstream valve 10f.

Convergent Pressure Control on a Closed Space

The control mechanism COM of the fluid control apparatus 100 according to the present embodiment has a function to control convergent pressure of a closed space formed when the upstream valve 10b and the downstream valve 10f are fully closed. The convergent pressure of the closed space is pressure stabilized after a predetermined period of time has elapsed since closing the upstream valve 10b and the downstream valve 10f.

Specifically, the control mechanism COM further includes a convergent pressure arithmetic unit 40 that calculates convergent pressure $P_{CONV}$ of the closed space when the upstream valve 10b is fully closed using at least one of the upstream pressure $P_1$ and the downstream pressure $P_2$ on the fluid resistance 10d in the channel 200. The valve controller 30 compares the calculated convergent pressure $P_{CONV}$ with a predetermined target convergent pressure $P_{T\_CONV}$ and fully closes the upstream valve 10b based on the result of the comparison.

The convergent pressure arithmetic unit 40 calculates the convergent pressure $P_{CONV}$ sequentially (in real time) during process control using at least one of the upstream pressure $P_1$ and the downstream pressure $P_2$ on the fluid resistance 10d in the channel 200. Specifically, the convergent pressure arithmetic unit 40 calculates the convergent pressure $P_{CONV}$ using the upstream pressure $P_1$ on the fluid resistance 10d, the downstream pressure $P_2$ on the fluid resistance 10d, the channel volume (upstream volume) $V_1$ between the fluid resistance 10d and the upstream valve 10b, and the channel volume (downstream volume) $V_2$ between the fluid resistance 10d and the downstream valve 10f.

The convergent pressure arithmetic unit 40 according to the present embodiment calculates the convergent pressure $P_{CONV}$ of the closed space formed between the upstream valve 10b and the downstream valve 10f using the following expression. The convergent pressure arithmetic unit 40 does not necessarily calculate the convergent pressure $P_{CONV}$ using the following expression and may calculate it using a lookup table. In this case, a lookup table may be used that has three parameters of the upstream pressure $P_1$, the downstream pressure $P_2$, and the convergent pressure $P_{CONV}$ of the closed space on the respective axes.

$$P_{CONV} = \frac{P_1 V_1 + P_2 V_2}{V_1 + V_2} \quad \text{Expression 1}$$

where $P_{CONV}$ is the convergent pressure of the closed space, $P_1$ is the upstream pressure on the fluid resistance 10d, $P_2$ is the downstream pressure on the fluid resistance 10d, $V_1$ is the channel volume between the fluid resistance 10d and the upstream valve 10b, and $V_2$ is the channel volume between the fluid resistance 10d and the downstream valve 10f.

Figure 2:
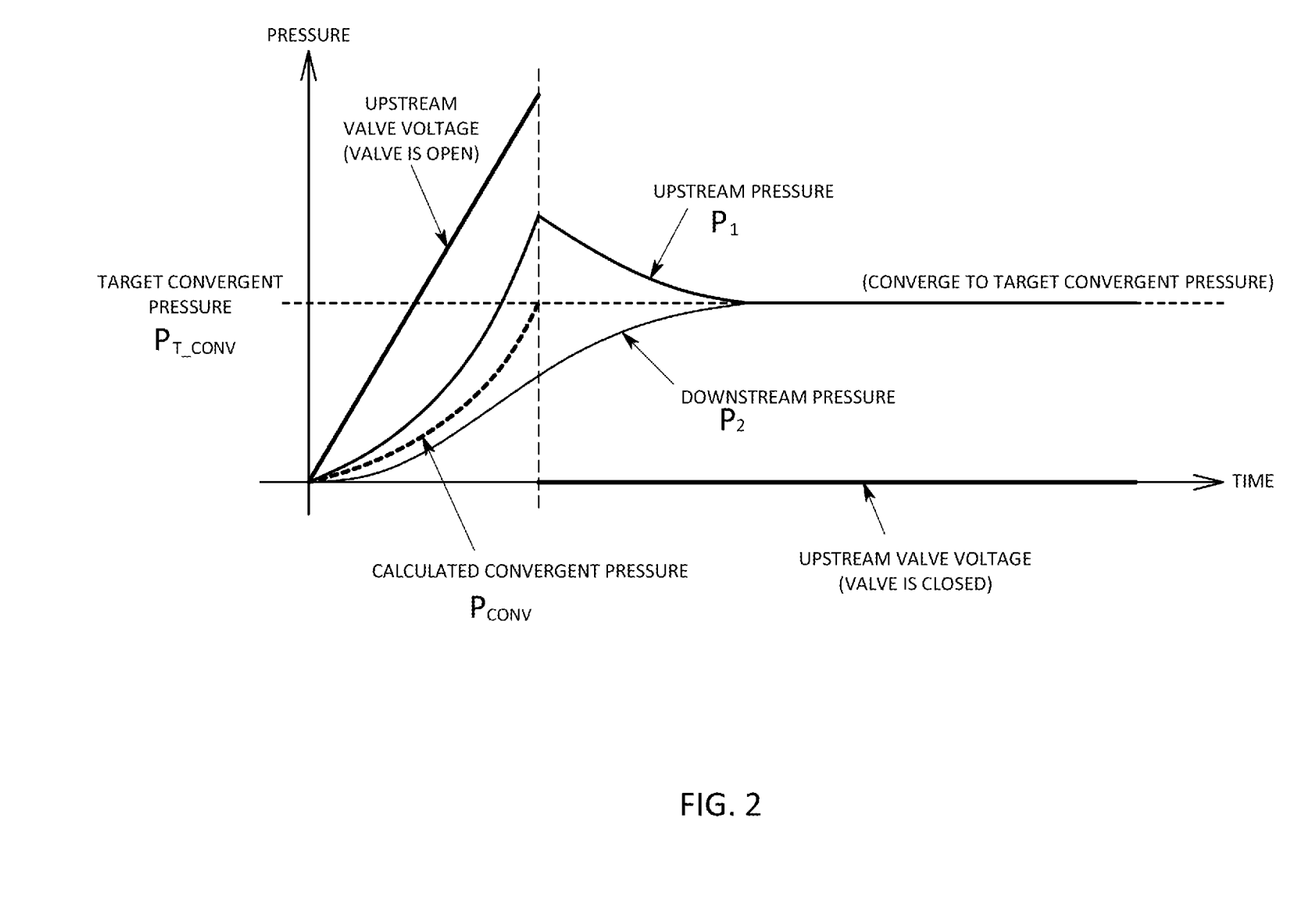
FIG. 2 is a graph indicating a method for controlling convergent pressure according to the embodiment.

As illustrated in FIG. 2, when the calculated convergent pressure $P_{CONV}$ is equal to or higher than the predetermined target convergent pressure $P_{T\_CONV}$, the valve controller 30 fully closes the upstream valve 10b. The predetermined target convergent pressure $P_{T\_CONV}$ is set based on such a pressure that enables gas of a full-scale (100%) set flow rate to flow just after the upstream valve 10b and the downstream valve 10f are opened.

The following describes a series of operations for adjusting the convergent pressure of the closed space between the upstream valve 10b and the downstream valve 10f to the target convergent pressure $P_{T\_CONV}$.

First, the valve controller 30 fully closes the upstream valve 10b and the downstream valve 10f in a normal gas supply state in which gas is flowing through the channel 200, thereby shutting off the flow of gas. The valve controller 30 fully closes the upstream valve 10b first and then fully closes the downstream valve 10f.

After fully closing the upstream valve 10b and the downstream valve 10f to shut off the channel 200, the valve controller 30 opens the upstream valve 10b and causes gas to flow into the space between the upstream valve 10b and the downstream valve 10f. The upstream pressure sensor 10c detects the upstream pressure $P_1$, and the downstream pressure sensor 10e detects the downstream pressure $P_2$.

The convergent pressure arithmetic unit 40 that has acquired the upstream pressure $P_1$ and the downstream pressure $P_2$ calculates the convergent pressure $P_{CONV}$ in real time while the gas is flowing into the space between the upstream valve 10b and the downstream valve 10f. The valve controller 30 sequentially acquires the convergent pressure $P_{CONV}$ calculated by the convergent pressure arithmetic unit 40 and compares it with the predetermined target convergent pressure $P_{T\_CONV}$. When the calculated convergent pressure $P_{CONV}$ reaches the predetermined target convergent pressure $P_{T\_CONV}$, the valve controller 30 fully closes the upstream valve 10b (refer to FIG. 2). As a result, the pressure of the closed space between the upstream valve 10b and the downstream valve 10f converges to the predetermined target convergent pressure $P_{T\_CONV}$ after a predetermined period of time has elapsed. To start supplying gas to the chamber thereafter, the valve controller 30 starts to control the upstream valve 10b and the downstream valve 10f based on a predetermined set flow rate.

Advantageous Effects of the Present Embodiment

The fluid control apparatus 100 according to the present embodiment having the configuration described above calculates the convergent pressure $P_{CONV}$ of the closed space when the upstream valve 10b is fully closed using at least one of the upstream pressure $P_1$ and the downstream pressure $P_2$ on the fluid resistance 10d. The fluid control apparatus 100 compares the calculated convergent pressure $P_{CONV}$ with the predetermined target convergent pressure $P_{T\_CONV}$ and fully closes the upstream valve 10b based on the result of the comparison. Consequently, the fluid control apparatus 100 can control the convergent pressure $P_{CONV}$ of the closed space at high speed while preventing overshooting.

Other Embodiments

While the embodiment described above, for example, calculates the convergent pressure $P_{CONV}$ using the upstream pressure $P_1$ on the fluid resistance 10d, the downstream pressure $P_2$ on the fluid resistance 10d, the channel volume $V_1$ between the fluid resistance 10d and the upstream valve 10b, and the channel volume $V_2$ between the fluid resistance 10d and the downstream valve 10f, the embodiment is not limited thereto. The embodiment may calculate the convergent pressure $P_{CONV}$ using only one of the upstream pressure $P_1$ on the fluid resistance 10d and the downstream pressure $P_2$ on the fluid resistance 10d. In this case, the embodiment calculates in advance the relation between the convergent pressure $P_{CONV}$ and one of the upstream pressure $P_1$ on the fluid resistance 10d and the downstream pressure $P_2$ on the fluid resistance 10d. Based on the relation, the embodiment calculates the convergent pressure $P_{CONV}$.

While the embodiment described above fully closes the upstream valve 10b to control the convergent pressure if the calculated convergent pressure $P_{CONV}$ is equal to the predetermined target convergent pressure $P_{T\_CONV}$, the embodiment is not limited thereto. The embodiment may assume a case where the calculated convergent pressure $P_{CONV}$ exceeds the target convergent pressure $P_{T\_CONV}$ and set a determination range with respect to the predetermined target convergent pressure $P_{T\_CONV}$. If the calculated convergent pressure $P_{CONV}$ falls within the determination range, the embodiment may fully close the upstream valve 10b.

Figure 3:
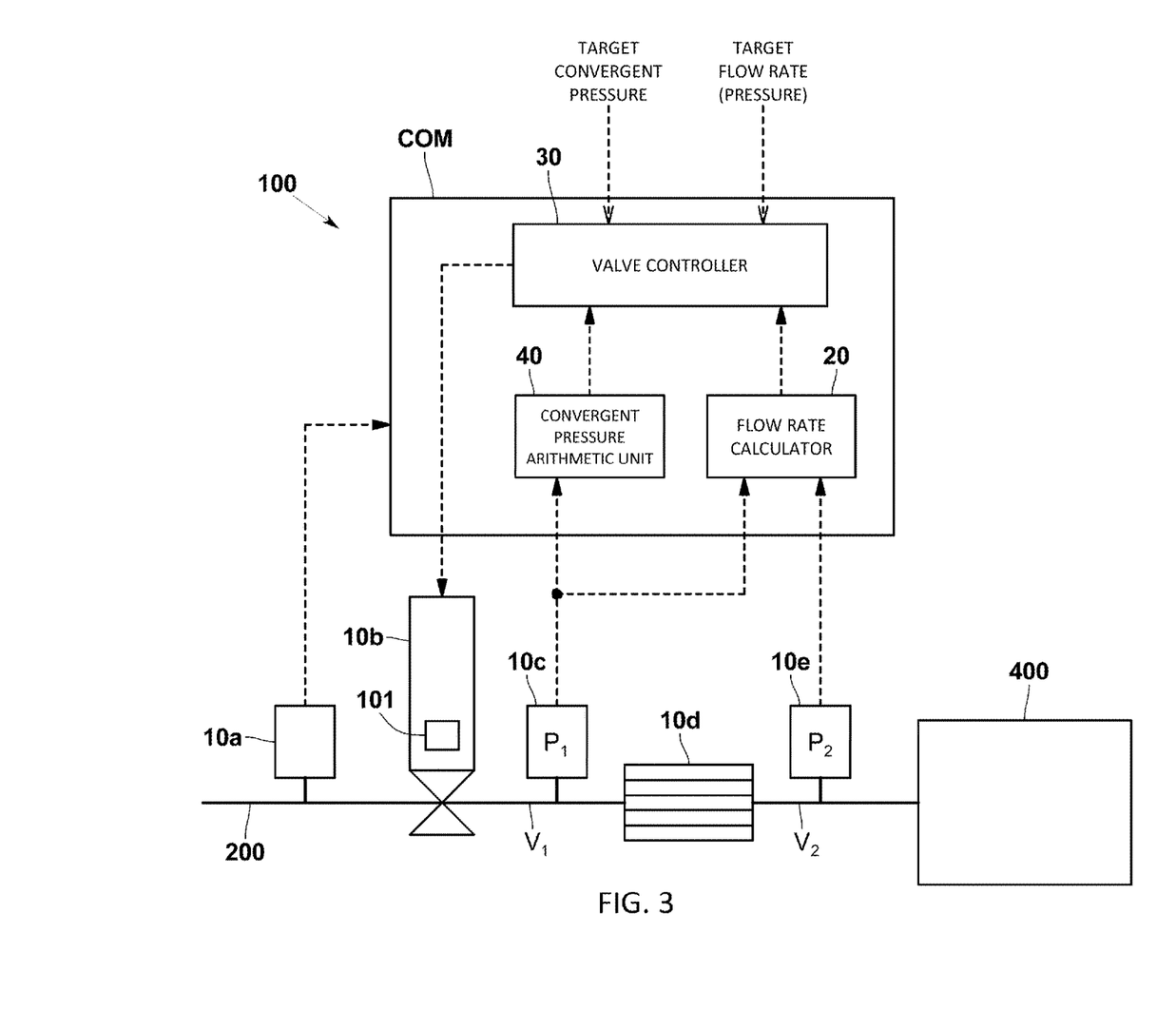
FIG. 3 is a schematic of the fluid control apparatus (pressure control system) according to a modification of the embodiment.

While the embodiment described above forms the closed space on the downstream of the upstream valve 10b by fully closing the downstream valve 10f, the embodiment is not limited thereto. The embodiment may form the closed space on the downstream of the upstream valve 10b without fully closing the downstream valve 10f. As illustrated in FIG. 3, for example, the embodiment may have a configuration that includes a closed container 400 coupled to the channel 200 provided with the fluid resistance 10d, thereby forming a closed space on the downstream of the fluid resistance 10d. In this configuration, the convergent pressure arithmetic unit 40 may calculate the convergent pressure $P_{CONV}$ using the upstream pressure on the fluid resistance 10d, the downstream pressure on the fluid resistance 10d, the channel volume between the fluid resistance 10d and the upstream valve 10b, and the volume of the channel on the downstream of the fluid resistance 10d and the volume of the closed container 400.

The convergent pressure arithmetic unit 40 according to the embodiment described above may calculate the convergent pressure $P_{CONV}$ by correcting a change over time in the volume of the closed space or the channel 200. The convergent pressure arithmetic unit 40 may change the target convergent pressure by considering a change over time in the volume of the closed space or the channel 200. The convergent pressure arithmetic unit 40 may include an alarm output unit that outputs alarm signals when the convergent pressure of the closed space has a difference of equal to or larger than a predetermined value with respect to the target convergent pressure as a result of controlling the convergent pressure based on the calculated convergent pressure.

The upstream volume $V_1$ and the downstream volume $V_2$ may possibly fluctuate due to variation in the position accuracy of the ends of the fluid resistance depending on the accuracy of processing the fluid resistance (laminar flow element). In this case, the convergent pressure arithmetic unit 40 may correct a change in volume in front of and behind the fluid resistance depending on the accuracy of processing the fluid resistance (laminar flow element).

While the embodiment described above is a twin-valve fluid control apparatus including the upstream valve 10b and the downstream valve 10f, it may be a single-valve fluid control apparatus including the upstream valve 10b alone.

While the embodiment described above is a fluid control apparatus that incorporates a pressure control system, it may be a pressure control system alone not incorporated in a fluid control apparatus.

The fluid resistance 10d according to the embodiment described above is a laminar flow element, it simply needs to be a resistor that generates pressure difference in the channel and may be an orifice, for example.

Various changes and combinations of the embodiments may be made without departing from the spirit of the present invention.

What is claimed is:

1. A pressure control system that is provided with a fluid resistance in a channel forming a closed space and is configured to control pressure of the closed space by controlling at least one of an upstream valve provided on an upstream of the fluid resistance and a downstream valve provided on a downstream of the fluid resistance, the pressure control system comprising:
    a convergent pressure arithmetic unit configured to calculate convergent pressure of the closed space using at least one of upstream pressure and downstream pressure on the fluid resistance in the channel and at least one of a channel volume between the fluid resistance and the upstream valve, and a channel volume between the fluid resistance and the downstream valve; and
    a valve controller configured to compare the calculated convergent pressure with a predetermined target convergent pressure and fully close the upstream valve based on a result of the comparison.

2. The pressure control system according to claim 1, wherein the valve controller fully closes the upstream valve when the calculated convergent pressure is equal to or higher than the predetermined target convergent pressure.

3. The pressure control system according to claim 1, further comprising:
    fully closing the downstream valve forming a closed space on the downstream of the fluid resistance, wherein the convergent pressure arithmetic unit calculates the convergent pressure using the upstream pressure on the fluid resistance, the downstream pressure on the fluid resistance, a channel volume between the fluid resistance and the upstream valve, and a channel volume between the fluid resistance and the downstream valve.

4. The pressure control system according to claim 3, wherein the convergent pressure arithmetic unit calculates the convergent pressure using the following expression:

$$P_{CONV} = \frac{P_1 V_1 + P_2 V_2}{V_1 + V_2}$$

where $P_{CONV}$ is the convergent pressure, $P_1$ is the upstream pressure on the fluid resistance, $P_2$ is the downstream pressure on the fluid resistance, $V_1$ is the channel volume between the fluid resistance and the upstream valve, and $V_2$ is the channel volume between the fluid resistance and the downstream valve.

5. The pressure control system according to claim 3, wherein the downstream valve is provided with a position sensor configured to detect a position of a disc with respect to a seat.

6. The pressure control system according to claim 1, wherein
the closed space is formed on a downstream of the fluid resistance by a closed container being coupled to the downstream of the fluid resistance in the channel, and
the convergent pressure arithmetic unit calculates the convergent pressure using the upstream pressure on the fluid resistance, the downstream pressure on the fluid resistance, a channel volume between the fluid resistance and the upstream valve, and the volume of the channel on the downstream of the fluid resistance and the volume of the closed container.

7. The pressure control system according to claim 1, wherein the convergent pressure arithmetic unit calculates the convergent pressure in real time using at least one of the upstream pressure and the downstream pressure on the fluid resistance in the channel.

8. The pressure control system according to claim 1, wherein the convergent pressure arithmetic unit calculates the convergent pressure by correcting a change over time in the volume of the closed space or the channel.

9. The pressure control system according to claim 1, wherein the upstream valve is provided with a position sensor configured to detect a position of a disc with respect to a seat.

10. A pressure control method performed by a pressure control system that is provided with a fluid resistance in a channel forming a closed space and is configured to control pressure of the closed space by controlling at least one of an upstream valve provided on an upstream of the fluid resistance and a downstream valve provided on a downstream of the fluid resistance, the pressure control method comprising:

calculating convergent pressure of the closed space using at least one of upstream pressure and downstream pressure on the fluid resistance in the channel and at least one of a channel volume between the fluid resistance and the upstream valve, and a channel volume between the fluid resistance and the downstream valve; and determining that the calculated convergent pressure is equal to or higher than a predetermined target convergent pressure and fully closing the upstream valve in response to determining that the calculated convergent pressure is equal to or higher than the predetermined target convergent pressure.

11. A non-transitory computer storage medium for use in a pressure control system that is provided with a fluid resistance in a channel forming a closed space and is configured to control pressure of the closed space by controlling at least one of an upstream valve provided on an upstream of the fluid resistance and a downstream valve provided on a downstream of the fluid resistance, the non-transitory computer storage medium causing a computer to function as:
a convergent pressure arithmetic unit configured to calculate convergent pressure of the closed space using at least one of upstream pressure and downstream pressure on the fluid resistance in the channel and at least one of a channel volume between the fluid resistance and the upstream valve, and a channel volume between the fluid resistance and the downstream valve; and
a valve controller configured to compare the calculated convergent pressure with a predetermined target convergent pressure and fully close the upstream valve based on a result of the comparison.

* * * * *